US012686431B2

(12) United States Patent
Meunier

(10) Patent No.: US 12,686,431 B2
(45) Date of Patent: Jul. 21, 2026

(54) VEHICLE STEERING WHEEL WITH HEATING DEVICE

(71) Applicant: Autoliv Development AB, Vargarda (SE)

(72) Inventor: Arthur Meunier, Poitiers (FR)

(73) Assignee: Autoliv Development AB, Vårgårda (SE)

( * ) Notice: Subject to any disclaimer, the term of this patent is extended or adjusted under 35 U.S.C. 154(b) by 992 days.

(21) Appl. No.: 17/758,945

(22) PCT Filed: Jan. 11, 2021

(86) PCT No.: PCT/EP2021/050351
§ 371 (c)(1),
(2) Date: Mar. 21, 2023

(87) PCT Pub. No.: WO2021/144214
PCT Pub. Date: Jul. 22, 2021

(65) Prior Publication Data
US 2023/0219613 A1      Jul. 13, 2023

(30) Foreign Application Priority Data

Jan. 16, 2020    (FR) ....................................... 2000398

(51) Int. Cl.
*B62D 1/06*          (2006.01)
*H05B 3/34*          (2006.01)
(52) U.S. Cl.
CPC .............. *B62D 1/065* (2013.01); *H05B 3/34* (2013.01)

(58) Field of Classification Search
None
See application file for complete search history.

(56) References Cited

U.S. PATENT DOCUMENTS

| | | | | | |
|---|---|---|---|---|---|
| 4,547,655 A | * | 10/1985 | Kurata | ................... | B62D 1/065 219/535 |
| 4,631,976 A | * | 12/1986 | Noda | ..................... | B62D 1/065 74/552 |
| 5,205,186 A | * | 4/1993 | Draxlmaier, Sr. | ....... | B62D 1/06 74/552 |
| 6,065,366 A | * | 5/2000 | Koyama | .................. | B62D 1/06 428/317.1 |
| 6,326,593 B1 | * | 12/2001 | Bonn | ....................... | D04B 1/14 219/545 |
| 6,360,632 B1 | * | 3/2002 | Papandreou | ............. | B62D 1/06 74/552 |

(Continued)

FOREIGN PATENT DOCUMENTS

DE          102004053634 A1      5/2006

*Primary Examiner* — Thor S Campbell
(74) *Attorney, Agent, or Firm* — Matthew D. Thayne; Thayne and Davis LLC

(57)          ABSTRACT

A vehicle steering wheel having a rim to be gripped by a driver of the vehicle, a trim casing arranged to cover a body of the rim so as to at least partially form an outer surface of the rim, a flexible heating device inserted between the trim casing and the body of the rim, comprising at least one heating track, wherein the heating track is a surface track deposited on the flexible heating device, and in that the rim body comprises at least one groove arranged to house at least one part of the flexible heating device, said at least one part comprising a portion of the surface track.

15 Claims, 4 Drawing Sheets

(56)  References Cited

U.S. PATENT DOCUMENTS

| | | | | | |
|---|---|---|---|---|---|
| 6,392,195 | B1 * | 5/2002 | Zhao | .................... | B62D 1/065 |
| | | | | | 219/204 |
| 6,509,552 | B1 * | 1/2003 | Roske | ................. | H05B 1/0236 |
| | | | | | 219/535 |
| 6,512,202 | B2 * | 1/2003 | Haag | .................... | B62D 1/065 |
| | | | | | 219/535 |
| 6,524,515 | B1 * | 2/2003 | Cavalli | ................... | B62D 1/06 |
| | | | | | 264/258 |
| 6,668,683 | B2 * | 12/2003 | Fleckenstein | ........... | B62D 1/06 |
| | | | | | 74/552 |
| 6,815,642 | B2 * | 11/2004 | Haag | .................... | B62D 1/065 |
| | | | | | 219/204 |
| 6,838,647 | B2 | 1/2005 | Nagele | | |
| 7,145,102 | B2 * | 12/2006 | Hadzizukic | ............. | H05B 3/34 |
| | | | | | 219/549 |
| 7,741,581 | B2 * | 6/2010 | Kreuzer | ................... | B62D 1/06 |
| | | | | | 74/552 |
| 8,278,602 | B2 * | 10/2012 | Yoneyama | ............... | H05B 3/34 |
| | | | | | 74/552 |
| 9,272,725 | B2 * | 3/2016 | Pekari | ...................... | B62D 1/06 |
| 9,493,906 | B2 * | 11/2016 | Werkman | ............... | H05B 3/262 |
| 10,983,016 | B2 * | 4/2021 | Guezelocak | ............. | G01L 1/20 |
| 12,311,995 | B2 * | 5/2025 | Vendrand | ............... | B62D 1/046 |
| 2002/0008097 | A1 * | 1/2002 | Hobby | ................... | B62D 1/065 |
| | | | | | 219/476 |
| 2004/0155020 | A1 * | 8/2004 | Worrell | .................... | H05B 3/48 |
| | | | | | 219/544 |
| 2019/0351931 | A1 | 11/2019 | Gallot et al. | | |
| 2020/0406797 | A1 * | 12/2020 | Greenwood | ........... | B60N 2/914 |
| 2023/0219613 | A1 * | 7/2023 | Meunier | ................. | H05B 3/34 |
| | | | | | 219/204 |

* cited by examiner

VEHICLE STEERING WHEEL WITH HEATING DEVICE

The present invention generally relates to a vehicle steering wheel comprising a heating device for heating a rim of the steering wheel.

Heating devices integrated into a steering wheel for heating the rim thereof are known in the prior art, such as that described in FR3061890A1. However, this system has the disadvantage in particular that it does not offer an adequate solution for preventing specific areas on the surface of the rim in which there could be a hot spot, or an excess thickness. Indeed, if, for example, the heating device (typically a flexible mat) has an area in which there is a higher specific heating power than in the rest of the heating device, then there may be an area on the surface of the rim that is hotter than the rest of the rim, and this must be avoided so as not to affect the quality perceived by the customer, or to avoid parts that have to be scrapped. The same applies if a heating mat has to be folded on itself: this can create regions of excess thickness on the surface, which can affect the perceived quality or result in scrapping.

U.S. Pat. No. 7,741,581B2 discloses a heated steering wheel. U.S. Pat. No. 6,838,647B2 discloses a flexible heating element. DE102004053634A1 discloses a heated steering wheel for a motor vehicle.

An aim of the present invention is to address the above-mentioned disadvantages of the prior art and in particular, firstly, to propose a steering wheel with a flexible heating device which does not affect the quality perceived by the customer touching the outer surface of the rim when driving the vehicle.

A first aspect of the invention therefore relates to a vehicle steering wheel comprising:

- a rim to be gripped by a driver of the vehicle,
- a trim casing arranged to cover a body of the rim so as to at least partially form an outer surface of the rim,
- a flexible heating device inserted between the trim casing and the body of the rim, comprising at least one heating track,
- characterized in that the heating track is a surface track deposited on the flexible heating device, and in that the body of the rim comprises at least one groove arranged so as to house at least one part of the flexible heating device, said at least one part comprising a portion of the surface track.

The steering wheel according to the above embodiment comprises a flexible heating device, and at least one groove is provided in the body of the rim (typically a foaming material) in order to accommodate a part of the flexible heating device, in particular a part which comprises a portion of the heating track. Consequently, it is possible to design a heating track and/or the rim of the steering wheel and its groove such that specific points or locations (in which a higher heating power or folds can be expected) can be housed in the groove in order to keep them away from the trim casing and the outer surface. This makes it possible to ensure a good perceived quality and/or to avoid scrapping.

In particular, reference can be made to a surface heating track, which excludes for example (round) wires which are braided or connected to a flexible support. In particular, this can be a surface track deposited on a flexible substrate of the flexible heating device, which can imply a thickness (t) much smaller than a width (w) of the heating track.

In particular, it is possible that t<w/4. Unlike a (round) wire, the shape of which on the support has almost no influence on the heat generated by the passage of the current, the shape of a surface profile has a significant influence on the heat generated. The invention is advantageous in that it proposes specifically positioning the surface heating areas that produce more heat than the rest of the track in a groove. According to particular examples, the heating track may be painted or printed, or may be formed from a conductive fabric.

Advantageously, the part of the flexible heating device housed in the groove can have a fold, i.e. a double thickness of the flexible heating device obtained by folding the flexible heating device on itself.

Advantageously, the flexible heating device can be arranged so as to deliver a target surface heating power, and the part of the flexible heating device housed in the groove and comprising a portion of the surface track can have at least one specific area in which a specific surface heating power may be different from the target surface heating power. In other words, one or more parts of the flexible heating device that have a higher surface power than the rest are housed in the groove in order to keep them away from the outer surface of the trim casing.

According to the above embodiment, at least one area with a specific surface heating power is housed in the groove. For example, it can be chosen to house at least one area with a specific surface heating power in a groove if said area with a specific surface heating power is located in a particular gripping area. However, it is also possible to have another area with a specific surface heating power (equivalent, similar or different) which is not housed in a groove, if for example this other area is not problematic (for example located away from the gripping areas of the steering wheel). However, at least at least one area with a specific surface heating power is housed in the groove so as to keep said area with a specific surface heating power away from the surface and make the heat sensation homogeneous at at least one location on the steering wheel.

Advantageously, the target surface heating power can be defined by a total electrical power of the heating track divided by a surface to be heated of the rim located opposite the heating track and delimited by an external perimeter of the heating track.

Advantageously, the specific area can have a surface area of between 100 mm$^2$ and 80 mm$^2$, and preferably between 50 mm$^2$ and 25 mm$^2$. A small surface is easy to house in a groove.

Advantageously, the specific surface heating power in the specific area can be different from the target surface heating power by at least 30%, and preferably at least 40%.

Advantageously, the part of the flexible heating device housed in the groove and comprising a portion of the surface track can have at least one specific area in which the heating track is convoluted. In the case of a surface heating track, the applicant found that convoluted (or bending or curved) areas were capable of having a higher heating power due to the current that can be concentrated along the shortest path, i.e. along the radius of curvature. By housing the parts in which the heating track is convoluted in the groove, these areas are kept away from the outer surface of the trim casing so that hot spots are less noticeable because the heat is better distributed.

Advantageously, the surface track in said specific area housed in the groove can comprise at least one curve of the heating track greater than 90°, and preferably greater than 150°. The applicant found that the phenomenon of concentration of current and heating along the radius of curvature was noticeable above these curvature values.

Advantageously, the surface track in said specific area housed in the groove can comprise two curves of the heating track which are greater than 90°, and preferably greater than 150°, and are preferably opposite one another. It is advantageous to house these areas in the groove because the specific heating powers are "added up" and these areas are also more difficult to keep taught: any folds will also be housed in the groove.

Advantageously, the part of the flexible heating device housed in the groove can comprise a portion in which a surface density of the heating track can be greater than an average surface density of the heating track.

Advantageously, the surface density of the heating track in said at least one part of said at least one specific area can be greater than the average surface density of the heating track by at least 20%.

Advantageously, the part of the flexible heating device housed in the groove can comprise a specific area in which a distance between two heating track portions can be smaller than an average distance between heating track portions.

Advantageously, the distance between two heating track portions in said at least one part of said at least one specific area arranged in the groove can be smaller than the average distance between heating track portions by at least 20%.

Advantageously, the trim casing can comprise at least two parts interconnected by a seam, leaving edges of the two parts free on a reverse side of the trim casing, and the seam and/or the edges can be at least partly arranged in said groove of the body of the rim. The groove can also be used to accommodate free edges, which also increases the perceived quality, with a tightly stretched trim casing without regions of excess thickness.

Advantageously, the flexible heating device can be in the form of a flexible sheet arranged along the perimeter of the rim, the flexible sheet can have an excess length relative to the perimeter of the rim, and at least one end of the flexible sheet can be folded back on itself and arranged in a groove of the body of the rim.

Advantageously, the end folded back on itself can comprise a specific area.

Advantageously:

the trim casing can comprise four seams oriented in a transverse direction of the rim, each seam leaving free edges of parts of the trim casing on a reverse side of the trim casing, the body of the rim can comprise four transverse grooves, each for at least partly accommodating the seam and/or the edges of each seam, the heating track can be arranged so as to define at least four specific areas which are each opposite the seams of the trim casing, so that each of the four specific areas can be arranged in a groove accommodating the edges and/or a seam.

Advantageously, the trim casing can comprise at least one part made of natural or synthetic leather.

Advantageously, the vehicle steering wheel can comprise a frame, and said at least one groove is formed in a material overmolded around the frame, or in an insert of the rim.

Advantageously, the heating track can be:

a track deposited or printed on the flexible heating device, which can have a width in a range of from 2 to 10 mm, and preferably a width of at least 3 mm and more preferably at least 4 or 5 mm, and a thickness in a range of from 10 μm to 150 μm, preferably 15 μm to 100 μm, a track cut out of a conductive fabric, and deposited (glued, sewn, etc.) on the flexible heating device, which can have a width in a range of from 2 to 10 mm, and preferably a width of at least 3 mm, and more preferably the width is at least 4 or 5 mm, and a thickness in a range of from 70 μm to 200 μm.

A second aspect of the invention relates to a motor vehicle comprising a vehicle steering wheel according to the first aspect.

DESCRIPTION OF THE FIGURES

Other features and advantages of the present invention will become more apparent upon reading the following detailed description of embodiments of the invention, which are provided by way of non-limiting examples and illustrated by the attached drawings, in which.

DETAILED DESCRIPTION OF THE EMBODIMENT(S)

Figure 1:
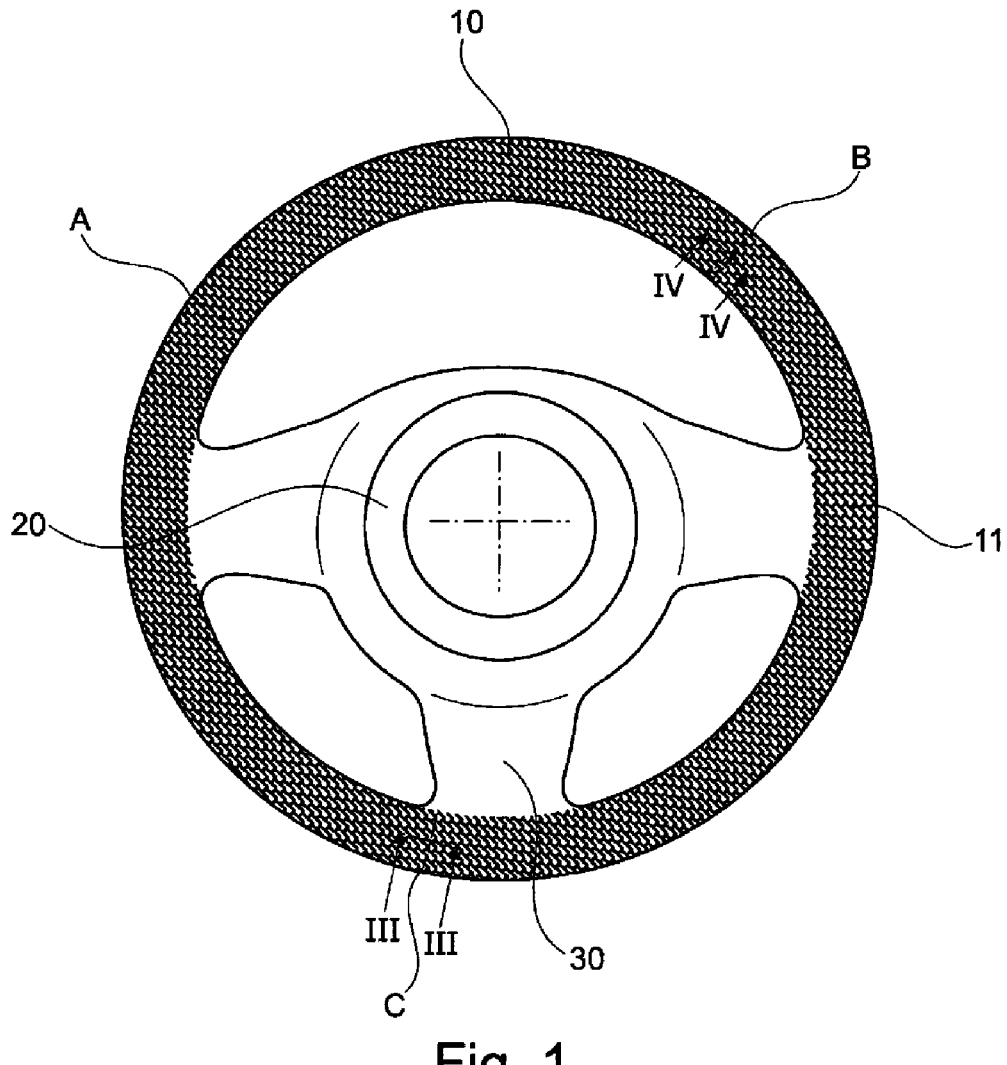
FIG. 1 shows a steering wheel according to the present invention.

FIG. 1 shows a steering wheel comprising a rim 10 that is connected to a hub 20 by at least one spoke 30. The rim 10 is covered by a trim casing 11, for example made of leather or another decorative or covering material (skai, fabric, alcantara, etc.).

Figure 2:
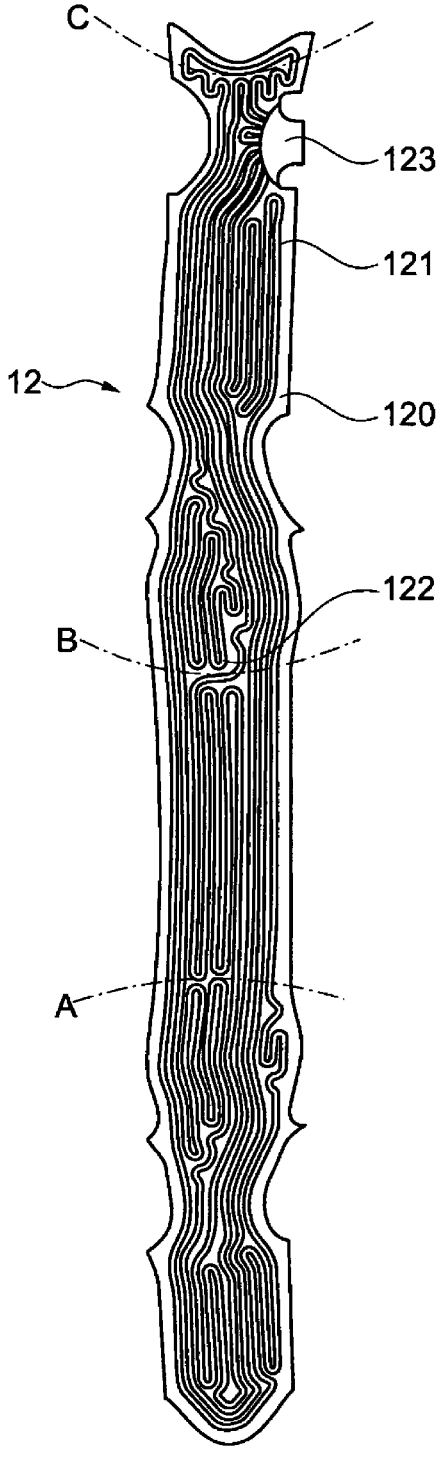
FIG. 2 shows a part of a flexible heating device of a rim of the steering wheel of FIG. 1.

Between the trim casing 11 and the body of the rim 10, a flexible heating device 12 is provided, which can be seen in FIG. 2, and is typically a heating mat. The flexible heating device 12 comprises in particular a flexible sheet 120 on which a plurality of heating tracks 121 are deposited which are connected to a connector 123 in order to be able to be plugged into an on-board network of the vehicle. In this example, four independent heating tracks 121 are provided, but there could also be more or fewer.

The heating tracks 121 are conductive and have a resistance in order to generate heat by Joule effect. The heating tracks 121 are deposited on the flexible sheet 120, for example by printing with a conductive ink or chemical etching or gluing adhesive tracks. This results in flat heating tracks 121 having a flattened cross-section. The thickness is typically greater than 15 μm, and the width is typically between 2 mm and 10 mm. According to a particular example, it is possible to have a painted conductive track with a minimum thickness of 15 μm, and a width of 4 mm or 5 mm. Alternatively, the heating track can be made of a thin conductive fabric which is cut and deposited and glued or sewn on the flexible sheet 120. The flexible sheet 120 is electrically insulating, and a fabric or film made of plastic can be provided.

Figure 5:
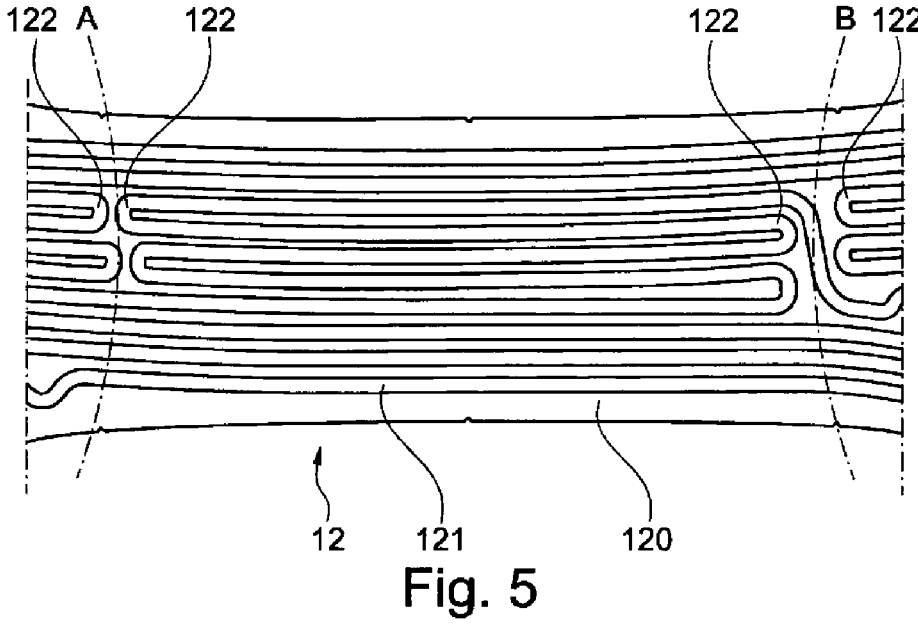
FIG. 5 shows a detail of the heating device of FIG. 2.

FIG. 2 shows that the heating tracks 121 are convoluted, and have curves or bends 122. FIG. 5 shows these curves or bends 122 in detail and the applicant found that the current in the curves or bend 122 was able to preferably flow "inside the bend", i.e. the electric current follows the shortest path. Consequently, the Joule effect is greater in these areas, which can generate hot spots. In addition, it can also be seen that the curves or bend 122 can be arranged so as to be opposite one another. This can also result in hot spots in which the heating power is greater than the rest of the mat.

Moreover, these specific areas in which the heating tracks 121 are convoluted may be less easy to tension so as to have no folds, or they may be more fragile in tension.

Consequently, the invention proposes to house at least one part of the flexible heating device 12 in a groove A, B or C of the body of the rim 10. This makes it possible for the areas that can generate hot spots, or that may be less easy to tension, to be kept away from the outer surface of the trim casing 11.

As shown in FIG. 1, three grooves A, B and C are provided in this case, but more or fewer could also be provided. As shown in FIGS. 2 and 5, the grooves A, B and C are provided at specific locations in order to accommodate the areas of the flexible heating device 12 in which the heating tracks 121 are convoluted (grooves A and B) or where there may be an excess length which is intended to be folded (groove C).

Figure 3:
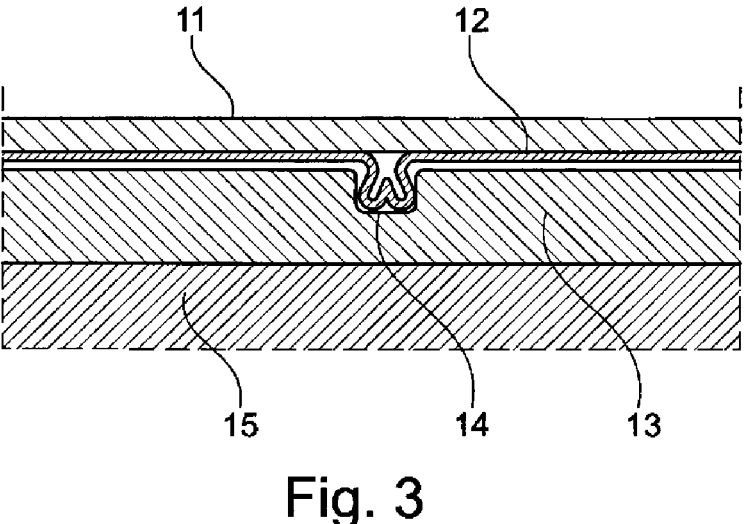
FIG. 3 shows a cross-sectional detail of a groove provided in the rim of the steering wheel of FIG. 1, in the direction III-III.

FIG. 3 shows a partial section of the rim 10 at the line III-III in FIG. 1, positioned on the groove C. The rim 10 is therefore covered by the trim casing 11, and the rim 10 comprises a frame 15 which is overmolded with an over-molding material 13 (for example polyurethane), in which the groove C, reference 14, is provided. FIG. 3 shows the flexible heating device 12 inserted between the trim casing 11 and the overmolding material 13, and a fold is formed in the groove C having reference 14 in order to keep the convoluted areas of the tracks 121, which can be seen at the top of FIG. 2, away from the trim casing 11. Thus, there will be no hot spots, nor will there be any excess thickness that the driver might notice in the trim casing 11, which ensures a good perceived quality.

Figure 4:
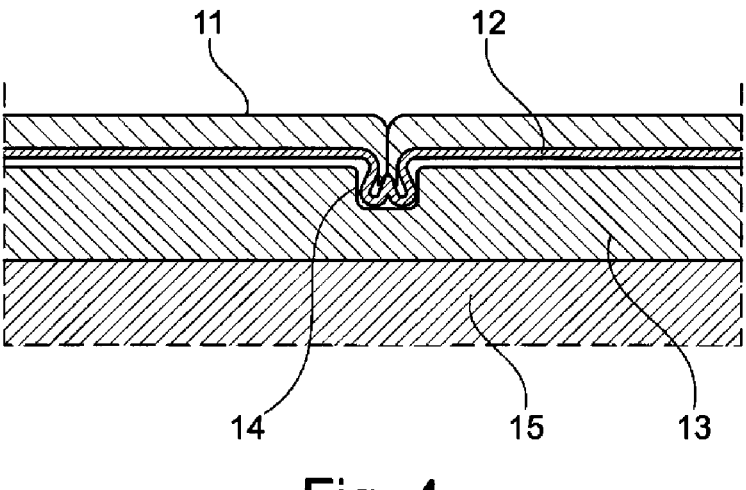
FIG. 4 shows a cross-sectional detail of another groove provided in the rim of the steering wheel of FIG. 1 in the direction IV-IV.

FIG. 4 shows a partial section of the rim 10 at the line IV-IV in FIG. 1, positioned on the groove B. The trim casing 11 and the frame 15, which is overmolded with an overmo-lding material 13 in which the groove B, reference 14, is provided, can be seen. FIG. 4 shows the flexible heating device 12 inserted between the trim casing 11 and the overmolding material 13, and a fold is formed in the groove B having reference 14. However, in this case, a seam is also provided in the trim casing 11 in order to join two parts together, and it is also provided to at least partially house the free edges of these parts in the groove B having reference 14. Thus, the groove B having reference 14 can accommodate the fold(s) of the flexible heating device 12 and the seam of the trim casing 11, or the free edges.

Figure 6:
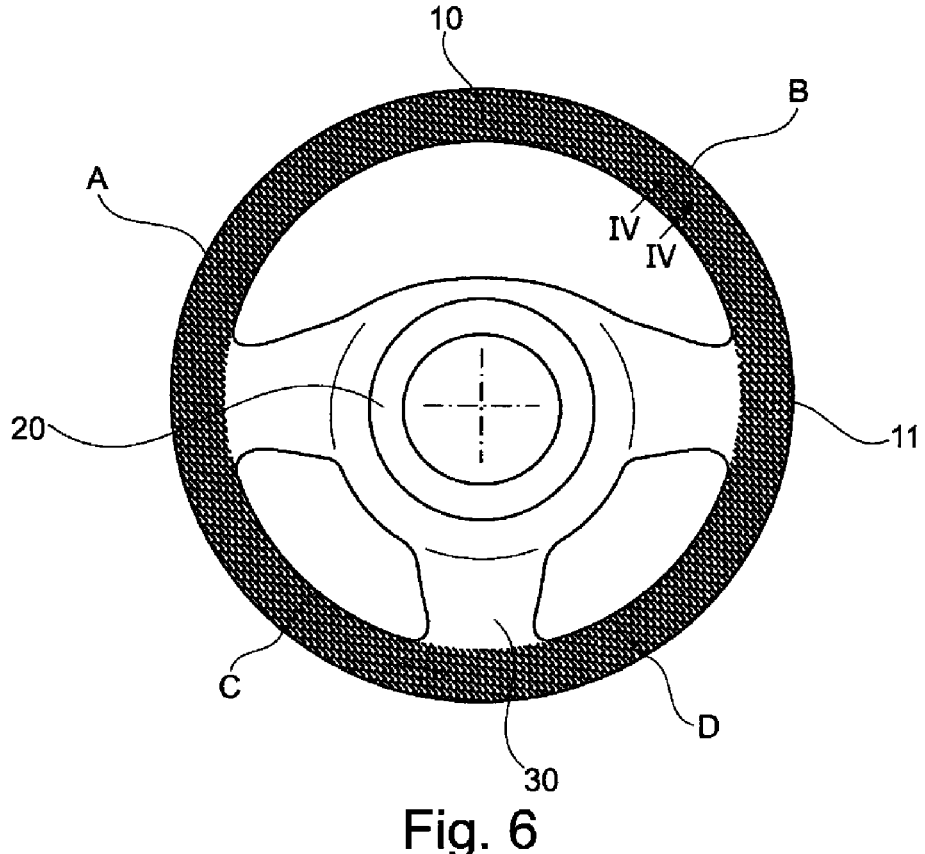
FIG. 6 shows a variant of the steering wheel of FIG. 1 with more seams on the rim.

FIG. 6 shows an example of a steering wheel similar to that in FIG. 1, but comprising four grooves A, B, C and D, with a seam of the trim casing 11 opposite each one, and free edges partially housed in the grooves A, B, C, D having reference 14, as shown in FIG. 4.

It will be understood that various modifications and/or improvements which are obvious for the person skilled in the art may be made to the different embodiments of the invention described in this present description without departing from the scope of the invention defined by the appended claims. In particular, reference is made to the grooves provided in the overmolding material 13, but it is possible to form the grooves with inserts, different overmo-lding materials, or to provide the grooves in the frame.

In addition, three or four grooves are shown, but there may be more or fewer than this number. It is also possible to provide grooves oriented in the tangential direction of the rim, or even in the spokes.

The invention claimed is:

1. A vehicle steering wheel comprising:
a rim to be gripped by a driver of the vehicle;
a trim casing arranged to cover a body of the rim so as to at least partially form an outer surface of the rim;
a flexible heating device inserted between the trim casing and the body of the rim, comprising at least one heating track, wherein the heating track is a surface track deposited on the flexible heating device, and in that the body of the rim comprises at least one groove arranged so as to house at least one part of the flexible heating device, said at least one part comprising a portion of the surface track, and wherein the portion of the surface track housed in the groove comprises at least one curved or bent region of the surface track corresponding to a specific area having a higher heating power than adjacent portions of the surface track.

2. The vehicle steering wheel according to claim 1, wherein the flexible heating device is arranged so as to deliver a target surface heating power, and wherein the part of the flexible heating device housed in the groove and comprising a portion of the surface track has at least one specific area in which a specific surface heating power is different from the target surface heating power.

3. The vehicle steering wheel according to claim 2, wherein the target surface heating power is defined by a total electrical power of the heating track divided by a surface to be heated of the rim located opposite the heating track and delimited by an external perimeter of the heating track, and wherein the specific area has a surface area of between 50 $mm^2$ and 25 $mm^2$.

4. The vehicle steering wheel according to claim 2, wherein the specific surface heating power in the specific area is different from the target surface heating power by at least 30%.

5. The vehicle steering wheel according to claim 1, wherein the part of the flexible heating device housed in the groove and comprising a portion of the surface track has at least one specific area in which the heating track is convo-luted.

6. The vehicle steering wheel according to claim 5, wherein the surface track in said specific area housed in the groove comprises at least one curve of the heating track greater than 90°.

7. The vehicle steering wheel according to claim 5, wherein the surface track in said specific area housed in the groove comprises two curves of the heating track which are greater than 90° and are opposite one another.

8. The vehicle steering wheel according to claim 2, wherein the part of the flexible heating device housed in the groove comprises a portion in which a surface density of the heating track is greater than an average surface density of the heating track.

9. The vehicle steering wheel according to claim 8, wherein the surface density of the heating track in said at least one part of said at least one specific area is greater than the average surface density of the heating track by at least 20%.

10. The vehicle steering wheel according to claim 1, wherein the part of the flexible heating device housed in the groove comprises a specific area in which a distance between two heating track portions is smaller than an average distance between heating track portions.

11. The vehicle steering wheel according to claim 10, wherein the distance between two heating track portions in said at least one part of said at least one specific area arranged in the groove is smaller than the average distance between heating track portions by at least 20%.

12. The vehicle steering wheel according to claim 1, wherein the trim casing comprises at least two parts interconnected by a seam, leaving edges of the two parts free on a reverse side of the trim casing, and the seam and/or the free edges are at least partly arranged in said groove of the body of the rim.

13. The vehicle steering wheel according to claim 1, wherein the flexible heating device is in the form of a flexible sheet arranged along the perimeter of the rim, wherein the flexible sheet has an excess length relative to the perimeter of the rim, and wherein at least one end of the flexible sheet is folded back on itself and arranged in a groove of the body of the rim.

14. The vehicle steering wheel according to claim 1, wherein:

the trim casing comprises four seams oriented in a transverse direction of the rim, each seam leaving free edges of parts of the trim casing on a reverse side of the trim casing, the body of the rim comprises four transverse grooves, each for at least partly accommodating the seam and/or the edges of each seam, the heating track is arranged so as to define at least four specific areas which are each opposite the seams of the trim casing, so that each of the four specific areas is arranged in a groove accommodating the edges and/or a seam.

15. A motor vehicle comprising a vehicle steering wheel, said vehicle steering wheel comprising:

a rim to be gripped by a driver of the vehicle;

a trim casing arranged to cover a body of the rim so as to at least partially form an outer surface of the rim;

a flexible heating device inserted between the trim casing and the body of the rim, comprising at least one heating track, wherein the heating track is a surface track deposited on the flexible heating device, and in that the body of the rim comprises at least one groove arranged so as to house at least one part of the flexible heating device, said at least one part comprising a portion of the surface track, and wherein the at least one heating track comprises at least one specific area corresponding to at least one curved or bent region of the surface track, the at least one specific area having a higher heating power than adjacent portions of the surface track, and wherein the at least one groove is configured to receive the at least one specific area so as to position the at least one specific area away from the outer surface of the rim.

\* \* \* \* \*